US009524356B2

(12) United States Patent
Chen-Keat et al.

(10) Patent No.: US 9,524,356 B2
(45) Date of Patent: Dec. 20, 2016

(54) SYSTEM AND METHODS OF GENERATING A COMPUTER MODEL OF COMPOSITE COMPONENT

(71) Applicant: General Electric Company, Schenectady, NY (US)

(72) Inventors: Teresa Tianshu Chen-Keat, Niskayuna, NY (US); Phinghai Yang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 540 days.

(21) Appl. No.: 14/055,514

(22) Filed: Oct. 16, 2013

(65) Prior Publication Data
US 2015/0106062 A1 Apr. 16, 2015

(51) Int. Cl.
G06F 17/50 (2006.01)
B29C 70/30 (2006.01)
B29C 70/38 (2006.01)

(52) U.S. Cl.
CPC ............ G06F 17/50 (2013.01); B29C 70/30 (2013.01); B29C 70/384 (2013.01); G06F 17/5018 (2013.01); G06F 2217/44 (2013.01)

(58) Field of Classification Search
None
See application file for complete search history.

(56) References Cited

U.S. PATENT DOCUMENTS

| 5,038,291 | A | * | 8/1991 | Wang | B29C 70/30 |
| | | | | | 345/420 |
| 5,984,511 | A | * | 11/1999 | Vasey-Glandon | G06F 17/50 |
| | | | | | 345/420 |
| 7,010,472 | B1 | * | 3/2006 | Vasey-Glandon | G06F 17/50 |
| | | | | | 700/97 |
| 7,099,725 | B2 | | 8/2006 | Murrish et al. | |
| 7,555,404 | B2 | * | 6/2009 | Brennan | B29C 70/32 |
| | | | | | 156/64 |
| 7,747,421 | B2 | | 6/2010 | Tang et al. | |
| 7,809,531 | B2 | | 10/2010 | Murrish | |

(Continued)

OTHER PUBLICATIONS

Weiss, A. et al., "Influence of ply-drop location on the fatigue behaviour of tapered composites laminates," Procedia Engineering 2, Elsevier Publishing, 2010, pp. 1105-1114.

(Continued)

Primary Examiner — Kibrom K Gebresilassie
(74) Attorney, Agent, or Firm — Armstrong Teasdale LLP

(57) ABSTRACT

A computer-implemented method for generating a computer model of a composite component includes offsetting a projected ply boundary curve outwardly along a base surface by a ply drop distance to define an offset ply boundary curve. Moreover, the method includes defining a ply region of the base surface, wherein ply region includes an area of the base surface that is interior the ply boundary curve. A ply drop region is defined, wherein the ply drop region includes another area of the base surface that is exterior the ply boundary curve and interior the offset ply boundary curve. The method includes generating a point cloud relative to the base surface, wherein the point cloud comprises a plurality of reference points and generating a ply surface using each reference point of the point cloud to facilitate generating a manufacturing lay-up sequence for the plurality of plies.

20 Claims, 9 Drawing Sheets

(56) References Cited

U.S. PATENT DOCUMENTS

| | | | |
|---|---|---|---|
| 8,004,517 B1* | 8/2011 | Edelsbrunner | G06T 17/20 345/419 |
| 8,108,058 B2* | 1/2012 | Murrish | G05B 19/4097 700/97 |
| 8,285,407 B2 | 10/2012 | Kessel et al. | |
| 8,315,837 B2 | 11/2012 | Menayo et al. | |
| 8,620,627 B2* | 12/2013 | Nakhle | G06F 17/5095 703/1 |
| 8,655,627 B2* | 2/2014 | Grape | G06F 17/5095 700/98 |
| 8,949,087 B2* | 2/2015 | Oliverius | G06F 17/5018 703/1 |
| 8,993,084 B2* | 3/2015 | Griess | B32B 5/26 428/60 |
| 2005/0119774 A1* | 6/2005 | Murrish | G06T 19/00 700/98 |
| 2006/0226287 A1* | 10/2006 | Grantham | B64C 1/12 244/119 |
| 2009/0043533 A1* | 2/2009 | Brennan | B29C 70/32 702/152 |
| 2011/0143082 A1 | 6/2011 | Fritz et al. | |
| 2012/0045606 A1* | 2/2012 | Griess | B32B 3/06 428/57 |
| 2012/0072182 A1 | 3/2012 | Berard | |
| 2012/0310604 A1 | 12/2012 | Bazilevs et al. | |
| 2012/0330620 A1 | 12/2012 | Sullivan et al. | |
| 2015/0370923 A1* | 12/2015 | Chen-Keat | G06T 17/00 703/1 |

OTHER PUBLICATIONS

Ma, W. et al., "Parameterization of randomly measured points for least squares fitting of B-spline curves and surfaces," Computer-Aided Design, vol. 27, No. 9, Sep. 1996, pp. 663-675.

Chen, X. et al., "Modelling and computer-aided design of 3D hollow woven reinforcement for composites," Journal of the Textile Institute, vol. 97, No. 1, 2006, pp. 79-87.

Joy, K.I. et al., "Boundary Determination for Trivariate Solids," Seventh Pacific Conference on Computer Graphics and Applications, Proceedings, 1999, pp. 82-91.

Yang, P. et al., "A B-spline-based approach to heterogeneous objects design and analysis," Computer-Aided Design, vol. 39, Issue 2, Feb. 2007, pp. 95-111.

Eck, M. et al., "Automatic Reconstruction of B-Spline Surfaces of Arbitrary Topological Type," SIGGRAPH'96, 1996, pp. 325-334.

* cited by examiner

SYSTEM AND METHODS OF GENERATING A COMPUTER MODEL OF COMPOSITE COMPONENT

BACKGROUND

The embodiments described herein relate generally to computer modeling, and more particularly, to systems and methods for generating a computer model of a composite component having a plurality of composite plies.

Composite laminate components generally include a plurality of layers or plies of composite material assembled together to provide the composite component with improved engineering properties. Composite components are typically manufactured by assembling a plurality of plies one on top of the other within a suitable tool or mold until a required thickness and shape is achieved. However, depending on the desired configuration of the component being manufactured, it may be necessary to taper the thickness of the plies. For example, thickness tapering may be required to create a component having a desired surface contouring or shape. To provide such thickness tapering, one or more shortened or terminated plies are typically introduced at various locations within the laminate to form ply drops. Each ply drop generally represents a step-reduction in the thickness of the laminate, thereby permitting a laminate material to taper from a thicker cross-section to a thinner cross-section.

The ply drops should be organized and represented on a computer ply model for subsequent manufacturing in order to lay-up and manufacture the composite component. In the design stage of the composite components, computer aided design ("CAD") models of the ply drops are sometimes generated. A typical CAD system may allow a user to construct and manipulate complex three dimensional (3D) models of objects or assemblies of objects. Moreover, the CAD system may provide a representation of modeled objects using edges or lines, which may be represented in various manners, e.g., non-uniform rational B-splines. These systems may manage parts or assemblies of parts as modeled objects, which typically include specifications of geometry. More particularly, computer aided files contain specifications, from which geometry is generated, which in turn allow for a representation to be generated, such that the systems include graphic tools for representing the modeled objects to the designers.

Current CAD systems may provide an approximate representation of the ply surface, ply drop, and associated curved or contoured surfaces. Conventional CAD systems, however, may not provide a direct method to generate the ply-by-ply definition for CAD modeling. However, some computer models may not design ply drops accurately. Moreover, some computer models are limited to generating closed and/or open curves of the ply surfaces and may not be able to generate the ply surfaces. Manufacturing processes for the composite component based on a typical 3D computer model may lead to lay-up issues for the composite laminates since the ply surfaces may not be properly defined in the modeling stage. Inaccurate computer modeling may lead to machine tool head collision with the composite laminate and/or an undesired tool path generation.

BRIEF DESCRIPTION

In one aspect, a computer-implemented method for generating a computer model of a composite component having a plurality of composite plies includes predefining a base surface and predefining a ply boundary curve having a ply thickness associated with a ply of the plurality of composite plies. A ply boundary surface is projected onto the base surface. The method includes offsetting the projected ply boundary curve outwardly along the base surface to define an offset ply boundary curve. Moreover, the method includes defining a ply region of the base surface, wherein the ply region includes an area of the base surface that is interior the ply boundary curve. A ply drop region is defined, wherein the ply drop region includes another area of the base surface that is exterior the ply boundary curve and interior the offset ply boundary curve. The method includes generating a point cloud relative to the base surface, wherein the point cloud comprises a plurality of reference points. A first reference point of the plurality of reference points is offset by the ply thickness in a direction normal to the base surface and a second reference point is offset by a function of a slope of the ply drop region in another direction normal to the base surface. The method includes generating a ply surface using each reference point of the point cloud to facilitate generating a manufacturing lay-up sequence for the plurality of plies.

In another aspect, a computer device for generating a computer model of a composite component having a plurality of composite plies includes a memory device configured to store a parameter of the composite component and an interface coupled to the memory device and configured to receive the parameter of the composite component. A processor is coupled to the memory device and the interface device. The processor is programmed to project a predefined ply boundary curve onto a predefined base surface. The processor is further programmed to offset the projected ply boundary curve outwardly along the base surface by the ply drop distance to define an offset ply boundary curve. A ply region of the base surface is defined, wherein the ply region includes an area of the base surface that is interior the ply boundary curve. The processor is configured to define a ply drop region of the base surface, wherein the ply drop region includes another area of the base surface that is exterior the ply boundary curve and interior the offset ply boundary curve. A point cloud relative to the base surface is generated by the processor, wherein the point cloud comprises a plurality of reference points. The processor is configured to offset a first reference point of the plurality of reference points in a direction normal to the base surface. Moreover, the processor is configured to offset a second reference point of the plurality of reference points by a function of a slope of the ply drop region in a direction normal to the base surface and configured to define a ply surface by each reference point of the point cloud.

In a further aspect, one or more non-transitory computer-readable media having computer-executable instructions embodied thereon for generating a computer model of a composite component having a plurality of composite plies using a computer having a memory device and a processor is provided. When executed by the processor, the computer-executable instructions cause the processor to predefine a base surface and predefine a ply boundary curve having a ply thickness associated with a ply of the plurality of composite plies. The processor is configured to project the ply boundary curve onto the base surface. Moreover, the processor is configured to offset the projected ply boundary curve outwardly along the base surface by the ply drop distance to define an offset ply boundary curve. A ply region of the base surface is defined, wherein the ply region includes an area of the base surface that is interior the ply boundary curve. The processor is configured to define a ply drop region of the base surface, wherein the ply drop region includes another area of the base surface that is exterior the ply boundary curve and interior the offset ply boundary curve. A point cloud relative to the base surface is generated, wherein the point cloud comprises a plurality of reference points. The processor is configured to offset a first reference point of the plurality of reference points by the ply thickness in a direction normal to the base surface and offset a second reference point of the plurality of reference points by a function of a slope of the ply drop distance in a direction normal to the base surface. The processor is configured to define a ply surface by each reference point of the point cloud.

DRAWINGS

These and other features, aspects, and advantages will become better understood when the following detailed description is read with reference to the accompanying drawings in which like characters represent like parts throughout the drawings, wherein.

Figure 1:
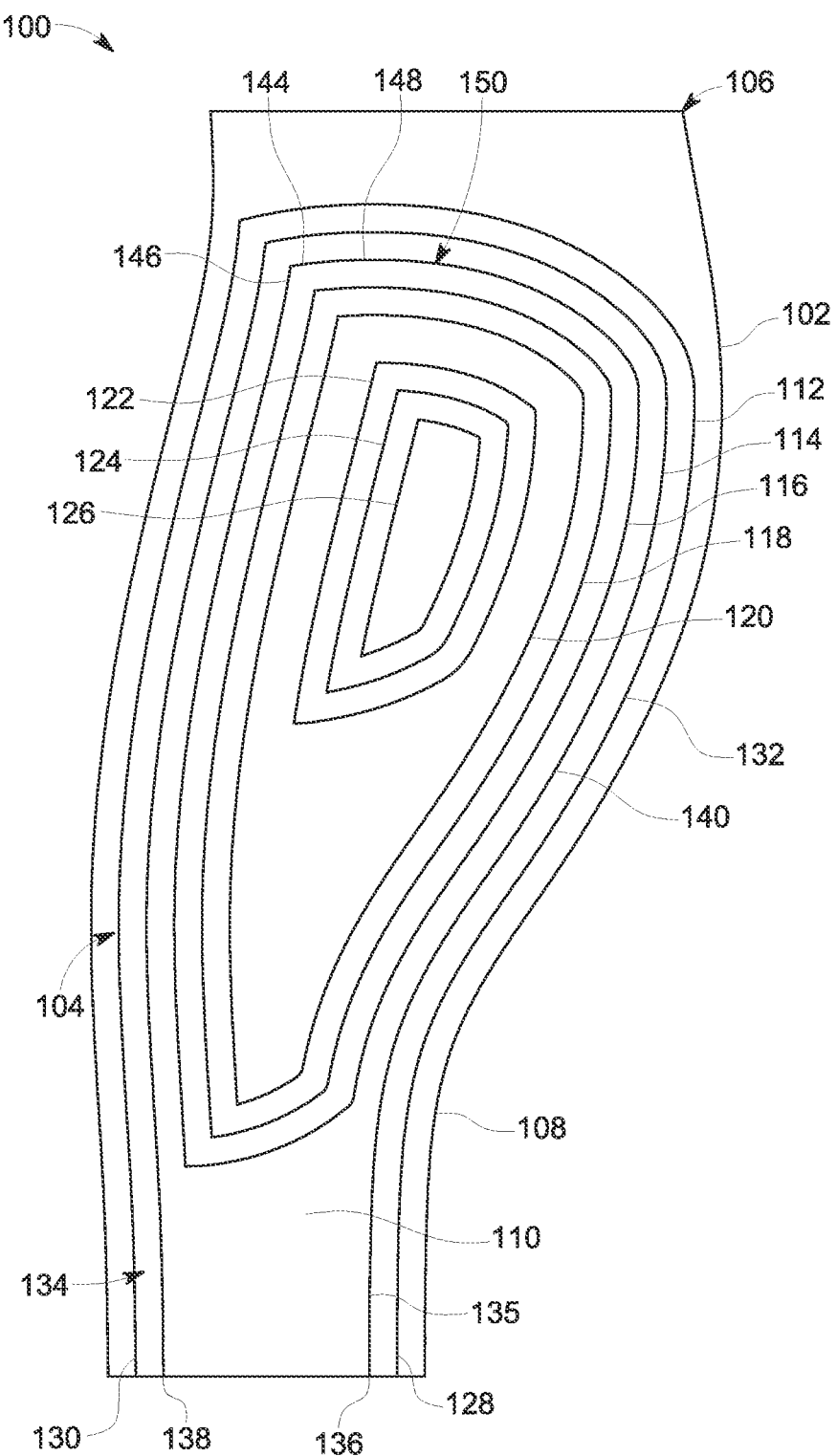
FIG. 1 is a plan view of an exemplary composite component having a base surface and a plurality of composite plies arranged in a spaced relationship with respect to the base surface.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The embodiments described herein relate to a system and methods of generating computer models of composite components using a mathematical basis spline analysis ("B-spline analysis"). More particularly, the embodiments relate to methods, systems and/or apparatus for generating a computer model of b-spline surface representations of composite components based at least on ply surface thicknesses and ply drop distances. It should be understood that the embodiments described herein include a variety of types of composite components, and further understood that the descriptions and figures that utilize turbine blades are exemplary only.

FIG. 1 is a plan view of a composite component 100 having a base surface 102 and a plurality of composite plies 104 arranged in a spaced relationship with respect to base surface 102. In the exemplary embodiment, composite component 100 includes a turbine blade 106. Alternatively, composite component 100 may include other structures such as, but not limited to, vanes, rotors, and stators. Composite component 100 may include any structure having a laminate formation requiring increased strength and stiffness. Base surface 102 includes a perimeter 108 and an internal surface area 110 defined by perimeter 108, the internal surface area 110 including the largest cross-sectional area of blade 106. Alternatively, base surface 102 may include other cross-sectional areas of composite component 100. The plurality of plies 104 includes a first ply 112, a second ply 114, a third ply 116, a fourth ply 118, a fifth ply 120, a sixth ply 122, a seventh ply 124, and an eighth ply 126. Alternatively, the plurality of plies 104 may include less than eight plies or more than eight plies. Composite component 100 may include any number of plies 104 to enable blade 106 to function as described herein.

In the exemplary embodiment, first ply 112 includes a first end 128, a second end 130 and a body 132 extending there between. First end 128 and second end 130 are configured to couple to base surface 102 at perimeter 108. More particularly, first end 128 and second end 130 do not couple to each other to facilitate forming an open curved surface 134. Second ply 114 also includes a first end 136, a second end 138, and a body extending 140 there between. First end 136 and second end 138 are coupled to base surface 102 at perimeter 108 to form another open curved surface 135. Third ply 116 includes a first end 144, a second end 146, and a body 148 extending there between. In the exemplary example, first end 144 and second end 146 are coupled to each other to facilitate forming a closed curve surface 150. Fifth ply 120, sixth ply 122, seventh ply 124 and eighth ply 126 further include respective first ends 144, second ends 146, and bodies 148 (not shown for clarity) extending there between. First ends 144 and second ends 146 of fourth ply 118, fifth ply 120, sixth ply 122, seventh ply 124 and eight ply 126 are further coupled to each other to form other closed curved surfaces 150. Plies 104 can include any open and/or closed surfaces to enable composite component 100 to function as described herein.

Figure 2:
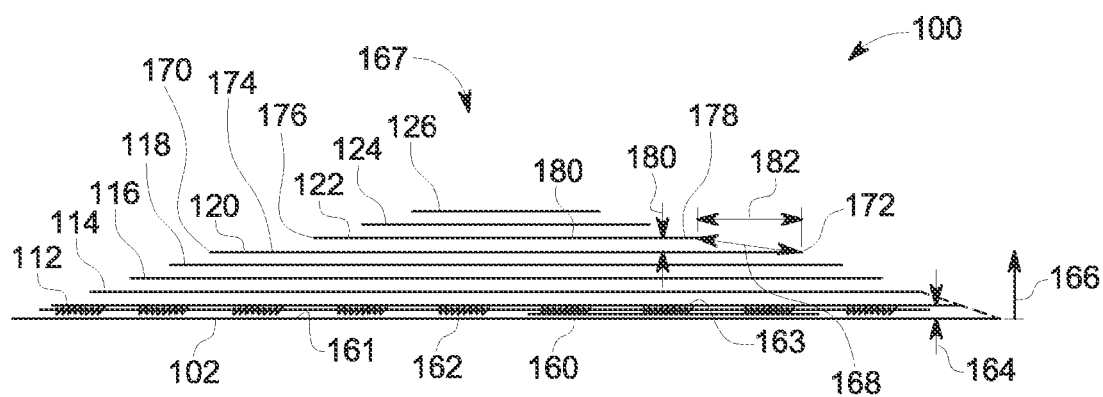
FIG. 2 is a side elevational view of the composite component shown in FIG. 1.

FIG. 2 is a side elevational view of composite component 100. In the exemplary embodiment, composite component 100 includes an ascending arrangement of plies, 112, 114, 116, 118, 120, 122, 124, and 126 as referenced from base surface 102. More particularly, each subsequent ply 104 has a shorter length than a previous ply 104. Each ply 104 includes a plurality of fibers 160 (fibers 160 only shown for first ply 112 for clarity purposes) surrounded by and supported within a matrix resin 162 (matrix resin 162 only showed for first ply 112 for clarity purposes). Fibers 160 are unidirectional and orientated within each ply 104 in a longitudinal direction of component 100. Each ply 104 includes a ply thickness 164 as measured between a first fiber 161 and a last fiber 163. Ply thickness 164 for each ply 104 may be the same or different depending on design criteria for composite component 100.

Plies 104 are sequentially arranged in a lay-up direction 166 with respect to base surface 102. In the exemplary embodiment, lay-up direction 166 is normal to base surface 102. Alternatively, lay-up direction 166 can be in any orientation with respect to base surface 102. More particularly, first ply 112 is coupled to base surface 102, second ply 114 is coupled to first ply 112, third ply 116 is coupled to second ply 114, fourth ply 118 is coupled to third ply 116, fifth ply 120 is coupled to fourth ply 118, sixth ply 122 is coupled to fifth ply 120, seventh ply 124 is coupled to sixth ply 122, and eighth ply 126 is coupled to seventh ply 124. Plies 112, 114, 116, 118, 120, 122, 124 and 126 are sequenced in an ascending arrangement 167 of decreasing lengths for plies 112, 114, 116, 118, 120, 122, 124 and 126 as referenced from base surface 102.

To enable a step-reduction or incremental change in the overall thickness of composite component 100, at least one ply drop 168 is formed within composite component 100. In the exemplary embodiment, each adjacent ply 104 is configured to form ply drop 168. More particularly, ply drop 168 includes a change in length between adjacent plies 104 of composite component 100. For example, fifth ply 120 includes an end 170, another end 172, and a length 174 extending there between and sixth ply 122 also includes an end 176, another end 178, and a length 180 there between. In the exemplary embodiment, length 180 is different than length 174. More particularly, length 180 is less than length 176. Alternatively, length 180 can be substantially the same or larger than length 174. Based on at least the difference between length 180 and length 174, a ply drop distance 182 is defined between end 172 and end 178.

Figure 3:
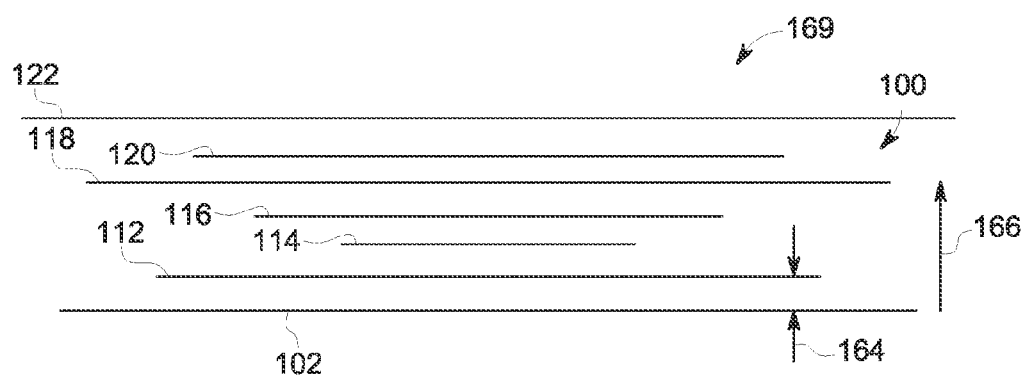
FIG. 3 is another side elevational view of composite component.
Figure 4:
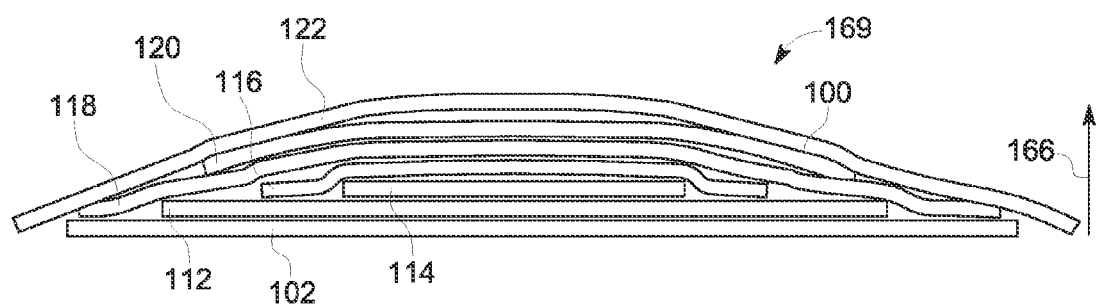
FIG. 4 is a schematic of the composite component shown in FIG. 3.

FIG. 3 is another side elevational view of composite component 100. FIG. 4 is a schematic of composite component 100. The composite component 100 includes an arrangement of plies, 112, 114, 116, 118, 120, and 122. Plies 104 are sequentially arranged in a lay-up direction 166 with respect to base surface 102. The lay-up direction 166 is normal to base surface 102. Alternatively, lay-up direction 166 can be in any orientation with respect to base surface 102. More particularly, first ply 112 is coupled to base surface 102, second ply 114 is coupled to first ply 112, third ply 116 is coupled to second ply 114, fourth ply 118 is coupled to third ply 116, fifth ply 120 is coupled to fourth ply 118, and sixth ply 122 is coupled to fifth ply 120. The plies 112, 114, 1156, 118, 120, and 122 are sequenced in another arrangement 169 that is different than arrangement 167 (shown in FIG. 2). The different lengths of plies 112, 114, 116, 118, 120, and 122 are sequenced with composite component 100 of different lengths for plies 112, 114, 116, 118, 120, and 122. More particularly, plies 112, 114, 114, 116, 118, 120, and 122 are sequenced in arrangement 169 with mixed lengths for plies 112, 114, 114, 116, 118, 120, and 122 disposed throughout component 100 as referenced from base surface 102.

Figure 5:
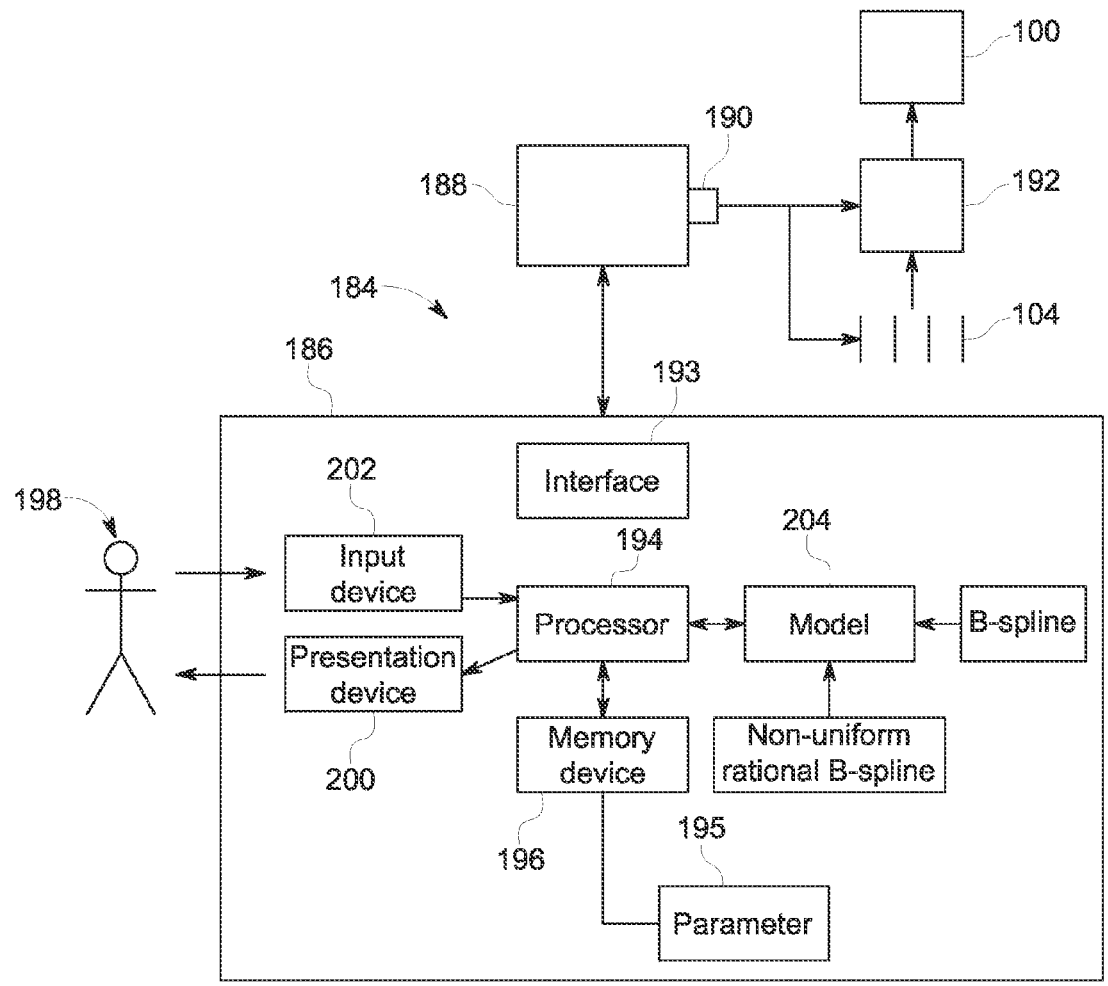
FIG. 5 is a block diagram illustrating an exemplary system having a computing device for use in computer modeling the composite component shown in FIGS. 1 and 2.

FIG. 5 is a block diagram illustrating a system 184 having a computing device 186 for use in computer modeling composite component 100. System 184 includes a lay-up device 188 coupled to computing device 186. The lay-up device 188 includes a tool 190 and a mandrel 192. Computing device 186 includes a computer aided design interface 193 having a processor 194 and a memory device 196. Processor 194 includes a processing unit, such as, without limitation, an integrated circuit (IC), an application specific integrated circuit (ASIC), a microcomputer, a programmable logic controller (PLC), and/or any other programmable circuit. Processor 194 may include multiple processing units (e.g., in a multi-core configuration). Computing device 186 is configurable to perform the operations described herein by programming processor 194. For example, processor 194 may be programmed by encoding an operation as one or more executable instructions and providing the executable instructions to processor 194 in memory 196 coupled to processor 194. Memory 196 includes, without limitation, one or more random access memory 196 (RAM) devices, one or more storage devices, and/or one or more computer readable media. Memory 196 is configured to store data, such as computer-executable instructions and parameters 195, such as configuration parameters of plies 104. More particularly, parameter 195 includes, but is not limited to, length, width, height, shape, and/or orientation of plies 104 (shown in FIGS. 1 and 2). Memory 196 includes any device allowing information, such as executable instructions and/or other data, to be stored and retrieved.

Stored in memory 196 are, for example, presentation readable instructions for providing a user interface to a user 198 via a presentation device 200, receiving and processing input from an input device 202, and/or determining at least one of ply drop 168 (shown in FIG. 2), ply drop distance 182 (shown in FIG. 2) and a lay-up sequence of plies 104. User interface 193 may include, among other possibilities, a web browser and/or a client application. Web browsers and client applications enable users 198 to display and interact with media and other information. Exemplary client applications include, without limitation, a software application for managing one or more computing devices 186.

The computing device 186 includes at least one presentation device 200 for presenting information to user 198. Presentation device 200 is any component capable of conveying information to user 198. Presentation device 200 includes, without limitation, a display device (not shown) (e.g., a liquid crystal display (LCD), organic light emitting diode (OLED) display, or "electronic ink" display) and/or an audio output device (e.g., a speaker or headphones). Presentation device 200 includes an output adapter (not shown), such as a video adapter and/or an audio adapter. Output adapter is operatively coupled to processor 194 and configured to be operatively coupled to an output device (not shown), such as a display device or an audio output device.

Moreover, computing device 186 includes input device 202 for receiving input from user. Input device 202 includes, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 200 and input device 202. Computing device 186 can be communicatively coupled to a network (not shown).

Computing device 186 is configured to use a mathematical analysis such as B-spline analysis to generate a computer model 204 of composite component 100 using B-surface representation of plies 104. Computing device 106 may also use other mathematical models such as a non-uniform rational B-spline analysis (NURB analysis). Computer model 204 is configured to be used with computer aided design software, in which part geometry is described in terms of features, such as, but not limited to, holes, lines, curves, chamfers, blends, radii, well defined shapes, user defined shapes, shapes from shape libraries and parameters associated with and between these features. The computer model 204 is flexible, in that composite component 100 is described by parameters 195, for example length, width, height, shape, and/or orientation of plies 104 all of which can vary. Processor 194 is configured to alter computer model 204 by changing the value of one or more of parameters 195. Moreover, computer model 204 applies to an entire part family. Components belonging to a part family differ only with respect to the values of the parameters describing the parts or with respect to small topological changes, for example different hole sizes or positions corresponding to different machining steps. The computer device 188 is configured to transmit computer model 204 to lay-up device 188. Lay-up device 188 is configured to control tool 190 to apply manufacturing processes to plies 104 as plies 104 are coupled to mandrel 192 to facilitate forming composite component 100.

Figure 6:
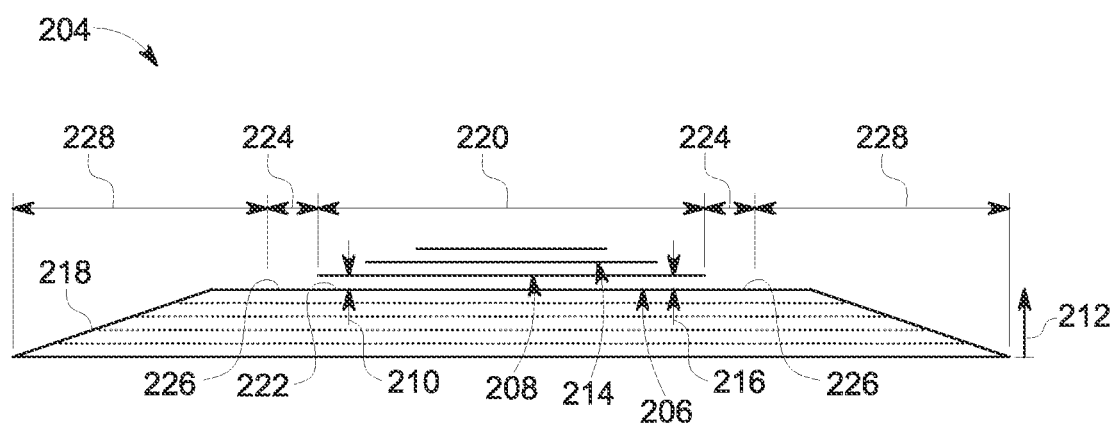
FIG. 6 is a side elevational view of an exemplary computer model of the composite component shown in FIGS. 1 and 2.
Figure 7:
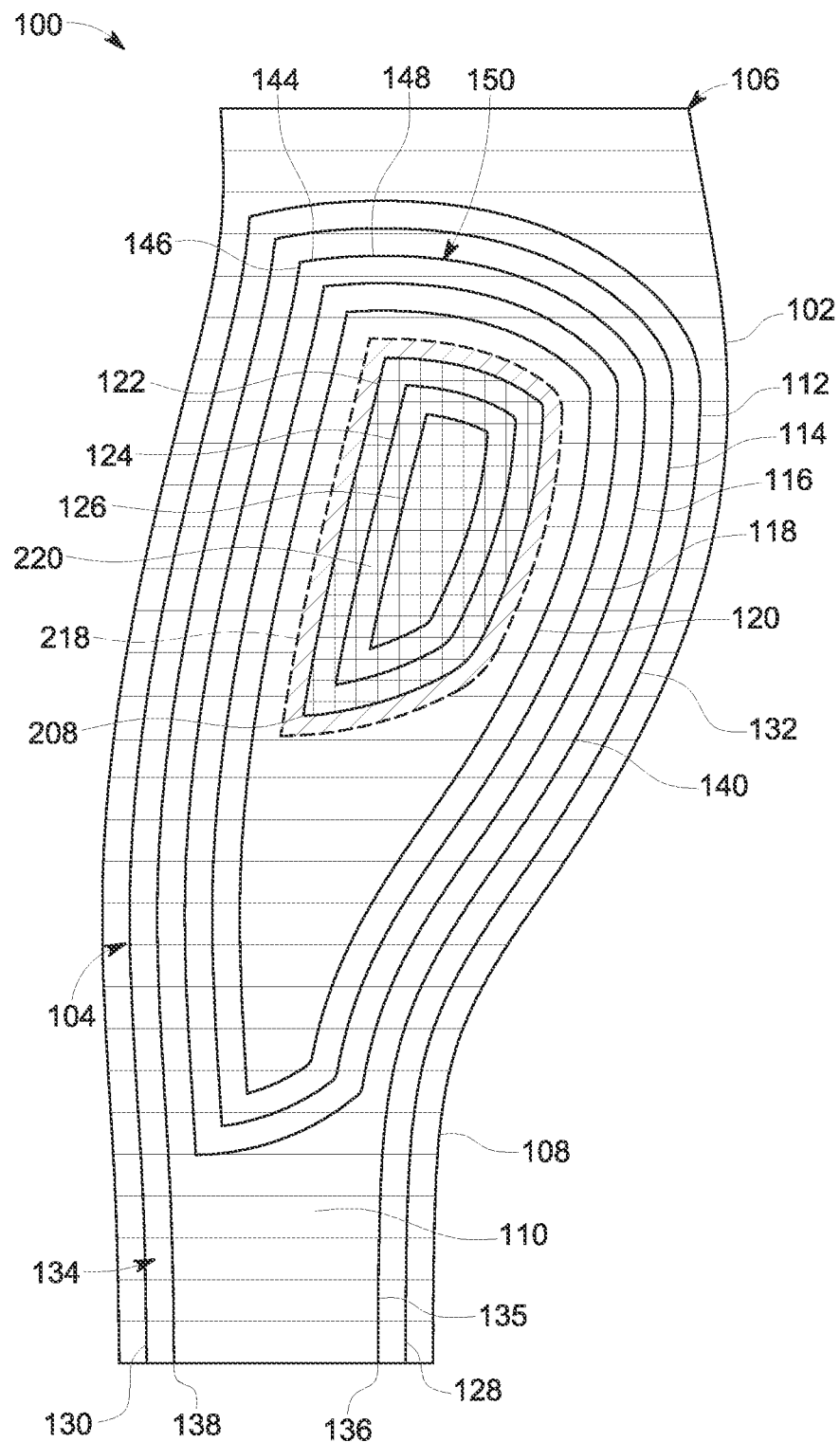
FIG. 7 is a plan view of the exemplary computer model (shown in FIG. 6) of the composite component having an exemplary ply drop region.

FIG. 6 is a side elevational view of computer model 204 of composite component 100 (shown in FIGS. 1 and 7). Processor 198 (shown in FIG. 5) is configured to generate a base surface 206 which is associated with the largest cross-sectional area of composite component 100 (shown in FIGS. 1 and 2). Processor 198 is also configured to generate a plurality of ply boundary curves 208 with each ply boundary curve 208 having a ply thickness 210. The ply boundary curve 208 includes at least one of open boundary curve 134 and closed boundary curve 150 (shown in FIG. 1). Moreover, each ply boundary curve 208 is associated with a respective ply 104 (shown in FIGS. 1 and 2). The base surface 206 and ply boundary curve 208 are pre-defined from known design constraints based on at least previous engineering analysis and/or historical analysis. Processor 198 is further configured to define a lay-up direction 212 that is normal to base surface 206. Each ply boundary curve 208 is projected in a sequential sequence 214 with respect to lay-up direction 212. Although ply boundary curves 208 are illustrated in an ascending arrangement of decreasing length as referenced from base surface 206, boundary curves 208 may be sequenced in any order with any lengths.

The processor 198 is configured to calculate a ply drop distance 216 between ply boundary curve 208 and base surface 206. Moreover, processor 198 is configured to offset ply boundary curve 208 outwardly from and along base surface 206. Ply boundary curve 208 is offset by processor 198 to facilitate defining an offset ply boundary curve 218. A ply region 220 is calculated by processor 198. The ply region 220 includes an area 222 of base surface 206 that is interior of ply boundary curve 208. Moreover, a ply drop region 224 of base surface 206 is defined by processor 198. Ply drop region 224 includes an area 226 of base surface 206 that is external of ply boundary curve 208 and interior of offset ply boundary curve 218. Still further, processor 198 is configured to define an outer region 228. More particularly, outer region 228 includes an area of base surface 206 that is exterior of offset ply boundary curve 218.

Figure 8:
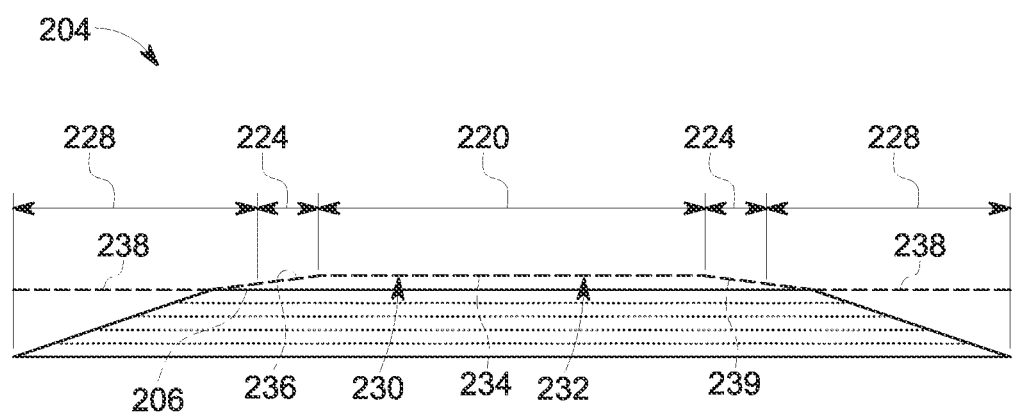
FIG. 8 is another side elevational view of the computer model of the composite component shown in FIGS. 1 and 2.

FIG. 8 is another side elevational view of computer model 204 of composite component 100 (shown in FIG. 1). Processor 198 is configured to generate a point cloud 230 relative to base surface 206. Point cloud 230 includes a plurality of reference points 232. The plurality of reference points 232 includes at least one first reference point 234, a second reference point 236, and a third reference point 238. At least one first reference point 234 is offset from base surface 206 by processor 198 in ply region 220. More particularly, at least one first reference point 234 is offset in a direction normal to base surface 206 and in ply region 220. Moreover, at least one second reference point 236 is offset by processor 198 in ply drop region 224. The second reference point 236 is offset from base surface 206 by processor 198 by a function of a slope 239 of ply drop region 224 relative to base surface 206. At least one third reference point 238 is offset by processor 198 in outer region 228. Processor 198 is configured to store at least one of third reference point 238 in outer region 228.

Figure 9:
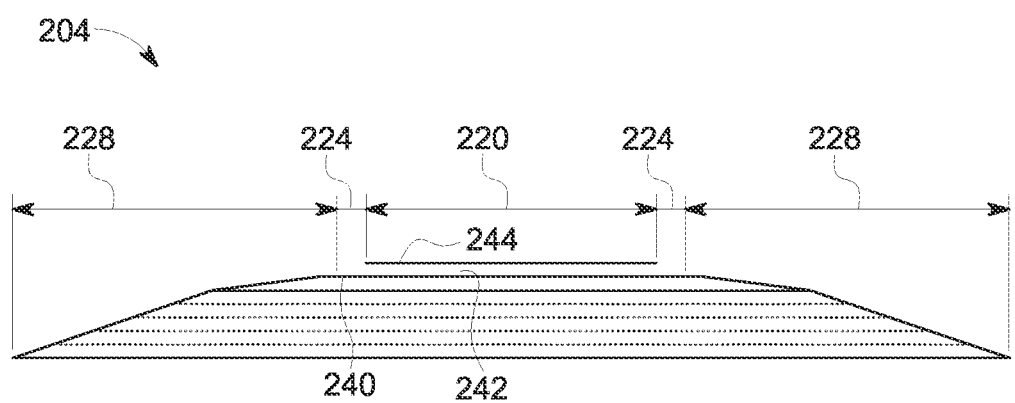
FIG. 9 is another side elevational view of the computer model of the composite component shown in FIGS. 1 and 2.

FIG. 9 is another side elevational view of computer model 204 of composite component 100 (shown in FIG. 1). Processor 198 is configured to generate a new ply surface 240 defined by at least one of first reference point 234 (shown in FIG. 8) and second reference point 236 (shown in FIG. 8). Ply surface 240 is redefined by processor 198 as another base surface 242. The processor 198 is configured to incorporate another ply boundary curve 244 to iteratively repeat defining ply region 220, ply drop region 224, outer region 228, and point cloud 230 (shown in FIG. 8) to computer model further lay-up sequencing for composite component 100.

Figure 10:
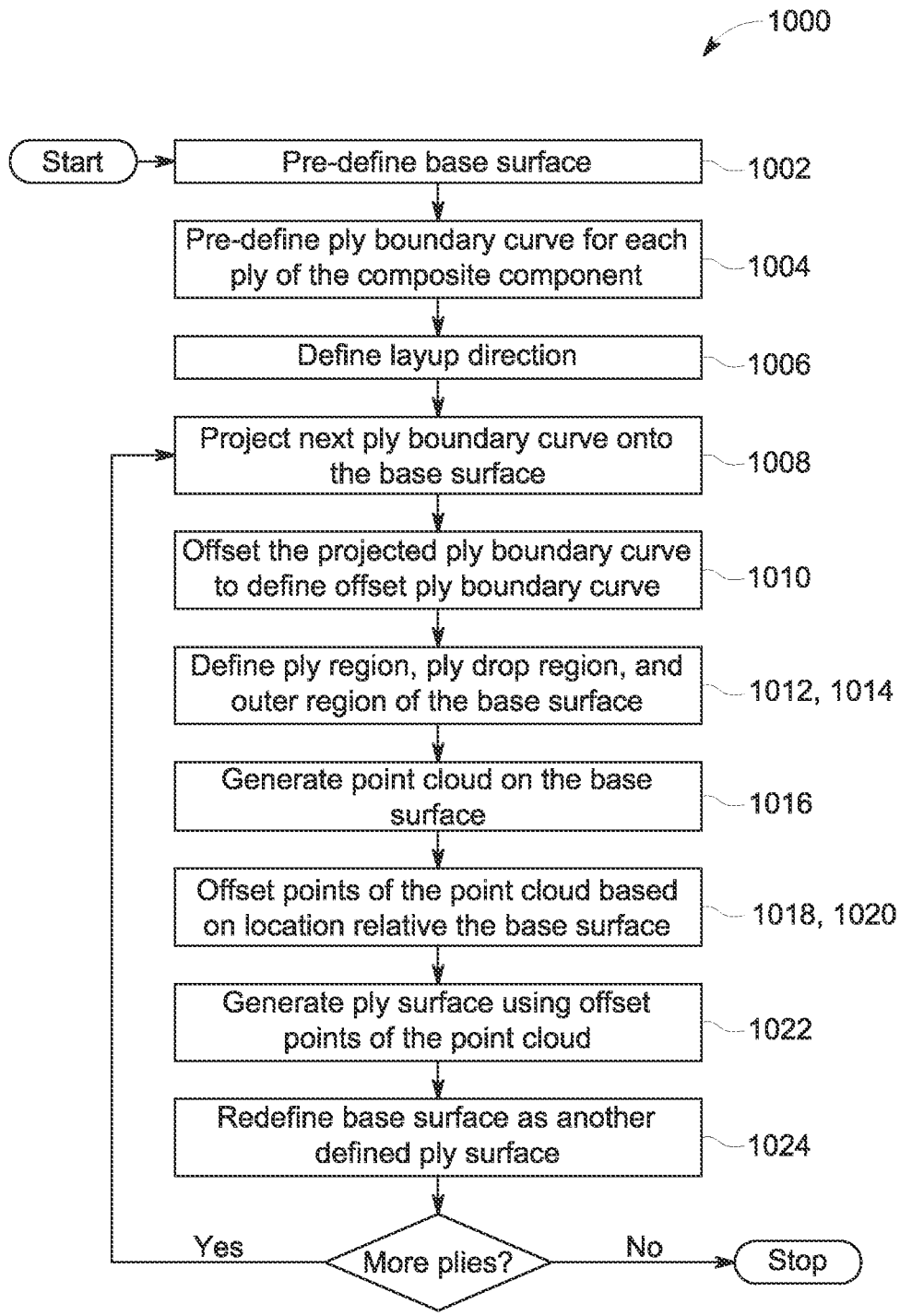
FIG. 10 is a flowchart illustrating an exemplary computer implemented method of generating a computer model of a composite component.

FIG. 10 is a flowchart illustrating an exemplary computer implemented method 1000 of generating a computer model, for example computer model 204 (shown in FIG. 3), of a composite component, such as composite component 100 (shown in FIG. 3) by a computing system, for example computing system 184 (shown in FIG. 5). Method 1000 includes pre-defining 1002 a base surface, such as base surface 206 (shown in FIG. 4), in a three-dimensional model, for example model 204 (shown in FIG. 5). Alternatively, the base surface may a base curve (not shown) in a two-dimensional model. In the exemplary method 1000, the base surface is defined and/or derived from known design constraints. A ply boundary curve, for example ply boundary curve 208 (shown in FIG. 6), is pre-defined 1004 and includes a ply thickness, such as ply thickness 210 (shown in FIG. 6), the ply boundary curve is defined along a defined 1006 lay-up direction, for example lay-up direction 166 (shown in FIG. 2). The ply boundary curve is associated with at least one of plies, for example plies 104 (shown in FIGS. 1 and 2). Method 1000 also includes projecting 1008 the ply boundary curve onto the base surface. In the exemplary method 1000, the ply boundary curve is defined and/or derived from pre-determined and/or known design constraints.

Method 1000 includes offsetting 1010 the projected ply boundary curve outwardly from and along the base surface to define an offset ply boundary curve, for example offset ply boundary curve 218 (shown in FIG. 6). A ply region, for example ply region 220 (shown in FIG. 6), is defined 1012. The ply region includes an area, such as area 222 (shown in FIG. 6), that is interior the offset ply boundary curve. Method 1000 also includes defining 1014 a ply drop region, such as ply drop region 224 (shown in FIG. 6). The ply drop region includes an area, for example area 226 (shown in FIG. 6), that is exterior the ply boundary curve and interior the offset ply boundary curve.

The point cloud, for example point cloud 230 (shown in FIG. 5), is generated 1016. The point cloud includes a plurality of reference points, such as reference points 232 (shown in FIG. 8). Method 1000 includes offsetting 1018 a first reference point, for example first reference point 234 (shown in FIG. 8), by the ply thickness in a direction normal to the base surface. In the method 1000, the first reference is located in ply region. Method 1000 further includes offsetting 1020 a second reference point, for example second reference point 236 (shown in FIG. 8), by a function of a slope, for example slope 2310 (shown in FIG. 8), of the ply drop region. The second reference point is located in the ply drop region. Method 1000 includes generating 1022 a ply surface, such as ply surface 240 (shown in FIG. 9), using each reference point of the point cloud and method 1000 includes redefining 1024 the ply surface as another base surface, for example base surface 242 (shown in FIG. 9).

The exemplary embodiments described herein facilitate increasing efficiency and reducing costs for generating a computer model of a composite component. More particularly, the exemplary embodiments described herein facilitate generating a computer model for enhanced designs of a b-spline surface representation for a lay-up sequence of a plurality of plies to form the composite component. More particularly, the exemplary embodiments described herein are configured to generate a computer model for three dimensional ply boundary curves, either open boundary curves or closed boundary curves, for a lay-up sequence of plies on a tooling surface. Moreover, the embodiments described herein provide a ply-by-ply surface definition to generate a ply sequence for high fidelity composite analysis. More particularly, the high fidelity analysis is configured to accurately locate high stress/shear locations positioned within composite component.

A technical effect of the systems and methods described herein includes at least one of: (a) generating a computer model of a composite component; (b) accounting for ply drop regions during a computer modeling stage of the composite component; (c) iteratively improving a computer aided design process by a computer model; (d) generating an enhanced lay-up sequence of a plurality of plies during the computer modeling stage of the composite component; and (e) increasing efficiency and decreasing costs for computer modeling of components.

Processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor. The above examples are exemplary only, and thus are not intended to limit in any way the definition and/or meaning of the term processor.

Exemplary embodiments of a computing device and computer implemented methods for generating a computer model of a composite component. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment may be implemented and utilized in connection with many other composite laminate applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the claimed inventions, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for generating a computer model of a composite component having a predefined base surface and a predefined ply boundary curve having a ply thickness associated with a ply of a plurality of composite plies, said method comprising:
projecting the ply boundary curve onto the base surface;
offsetting the projected ply boundary curve outwardly along the base surface to define an offset ply boundary curve;
defining a ply region of the base surface, wherein the ply region includes an area of the base surface that is interior the ply boundary curve;
defining a ply drop region of the base surface, wherein the ply drop region includes another area of the base surface that is exterior the ply boundary curve and interior the offset ply boundary curve;
generating a point cloud relative to the base surface, wherein the point cloud comprises a plurality of reference points;
offsetting a first reference point of the plurality of reference points by the ply thickness in a direction normal to the base surface;
offsetting a second reference point of the plurality of reference points by a function of a slope of the ply drop region in another direction normal to the base surface; and
generating a ply surface using the offsetting of the first reference point and the offsetting of the second reference point of the point cloud to facilitate generating a manufacturing lay-up sequence for the plurality of plies.

2. The computer-implemented method of claim 1, further comprising defining an outer region of the base surface, wherein the outer region includes another area of the base surface that is exterior the offset ply boundary curve and storing the location of a third reference point of the plurality of reference points located in the outer region.

3. The computer-implemented method of claim 1, further comprising redefining the ply surface as another base surface.

4. The computer-implemented method of claim 1, wherein the base surface includes the largest cross-sectional area of the composite component.

5. The computer-implemented method of claim 1, wherein the boundary curve includes at least one of a closed curve and an open curve.

6. The computer-implemented method of claim 1, wherein the boundary curve includes at least one of a B-spline generated curve and a non-uniform rational B-spline generated curve.

7. The computer-implemented method of claim 1, wherein the first reference point is located in the ply region.

8. The computer-implemented method of claim 1, wherein the second reference point is located in the ply drop region.

9. The computer implemented method of claim 1, wherein predefining the base surface comprises predefining the base surface in a three-dimensional model.

10. The computer implemented method of claim 1, wherein predefining the base surface comprises predefining the base surface in a two-dimensional model.

11. A computer device for generating a computer model of a composite component having a base surface, a ply boundary curve, and plurality of composite plies, said device comprising:
a memory device configured to store a parameter of the composite component;
an interface coupled to said memory device and configured to receive said parameter of the composite component; and
a processor coupled to said memory device and said interface device, said processor programmed to:
project the ply boundary curve onto the base surface;
offset said projected ply boundary curve outwardly along said base surface by a ply drop distance to define an offset ply boundary curve;
define a ply region of said base surface, wherein said ply region includes an area of said base surface that is interior said ply boundary curve;
define a ply drop region of said base surface, wherein said ply drop region includes another area of said base surface that is exterior said ply boundary curve and interior said offset ply boundary curve;
generate a point cloud relative to said base surface, wherein said point cloud comprises a plurality of reference points;
offset a first reference point of said plurality of reference points in a direction normal to said base surface;
offset a second reference point of said plurality of reference points by a function of a slope of said ply drop region in a direction normal to said base surface; and
generate a ply surface using the offsetting of the first reference point and the offsetting of the second reference point of the point cloud to facilitate generating a manufacturing lay-up sequence for the plurality of plies.

12. The computer device of claim 11, wherein the ply boundary curve includes at least one of a closed curve and an open curve.

13. The computer device of claim 11, wherein said processor is programmed to define a layup direction that is normal to said base surface.

14. The computer device of claim 11, wherein said processor is programmed to define an outer region of said base surface, wherein said outer region includes another area of said base surface that is exterior said ply boundary curve.

15. The computer device of claim 14, wherein said processor is programmed to store the location of a third reference point of said plurality of reference points located in said outer region.

16. The computer device of claim 11, wherein said processor is programmed to redefine said ply surface as another base surface.

17. The computer device of claim 11, wherein said first reference point is located in the ply region and said second reference point is located in the ply drop region.

18. One or more non-transitory computer-readable media having computer-executable instructions embodied thereon for generating a computer model of a composite component having a plurality of composite plies using a computer having a memory device and a processor, wherein when executed by said processor, said computer-executable instructions cause said processor to:
predefine a base surface;

predefine a ply boundary curve having a ply thickness associated with a ply of said plurality of composite plies;

project said ply boundary curve onto said base surface;

offset said projected ply boundary curve outwardly along said base surface by a ply drop distance to define an offset ply boundary curve;

define a ply region of said base surface, wherein said ply region includes an area of said base surface that is interior said ply boundary curve;

define a ply drop region of said base surface, wherein said ply drop region includes another area of said base surface that is exterior said ply boundary curve and interior said offset ply boundary curve;

generate a point cloud relative to said base surface, wherein said point cloud comprises a plurality of reference points;

offset a first reference point of said plurality of reference points by said ply thickness in a direction normal to said base surface;

offset a second reference point of said plurality of reference points by a function of a slope of said ply drop distance in a direction normal to said base surface; and generate a ply surface using the offsetting of the first reference point and the offsetting of the second reference point of the point cloud to facilitate generating a manufacturing lay-up sequence for the plurality of plies.

19. The one or more non-transitory computer-readable media of claim 18, wherein computer-executable instructions cause said processor to locate said first reference point in said ply region and said second reference point in said ply drop region.

20. The one or more non-transitory computer-readable media of claim 18, wherein computer-executable instructions cause said processor to redefine said ply surface as another base surface.

* * * * *